(12) United States Patent
Chintala et al.

(10) Patent No.: US 10,911,336 B2
(45) Date of Patent: Feb. 2, 2021

(54) SCALABLE VISUALIZATION OF HEALTH DATA FOR NETWORK DEVICES

(71) Applicant: Juniper Networks, Inc., Sunnyvale, CA (US)

(72) Inventors: Ajay Kumar Chintala, Santa Clara, CA (US); Nilesh Kantilal Simaria, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 160 days.

(21) Appl. No.: 16/167,358

(22) Filed: Oct. 22, 2018

(65) Prior Publication Data
US 2020/0127903 A1    Apr. 23, 2020

(51) Int. Cl.
| | |
|---|---|
| *H04L 12/26* | (2006.01) |
| *G06F 16/22* | (2019.01) |
| *G06F 11/32* | (2006.01) |
| *G06F 11/34* | (2006.01) |

(52) U.S. Cl.
CPC .......... *H04L 43/045* (2013.01); *G06F 11/321* (2013.01); *G06F 11/328* (2013.01); *G06F 11/3409* (2013.01); *G06F 16/2246* (2019.01); *H04L 43/0817* (2013.01); *H04L 43/10* (2013.01)

(58) Field of Classification Search
CPC .............. G06F 11/3006; G06F 11/327; G06F 11/3433; G06F 11/3452; G06F 21/41; G06F 9/5072; H04L 41/22; H04L 43/045; H04L 43/06; H04L 43/0876
See application file for complete search history.

(56) References Cited

U.S. PATENT DOCUMENTS 6,271,845 B1 * 8/2001 Richardson ......... H04L 41/0893
715/764
9,407,521 B1    8/2016 Kulkarni
(Continued)

FOREIGN PATENT DOCUMENTS

WO    2018114016 A1    6/2018

OTHER PUBLICATIONS

Extended European Search Report received in counterpart EP Application No. 19180810.4, dated Oct. 7, 2019, 7 pp.
(Continued)

*Primary Examiner* — Aftab N. Khan
(74) *Attorney, Agent, or Firm* — Shumaker & Sieffert, P.A.

(57) ABSTRACT

This disclosure describes techniques that include presenting a visual information that conveys information about health data associated with a large number of network devices or a large number of attributes of one or more network devices. In one example, this disclosure describes a method that includes collecting performance indicator data and determining a plurality of health status values based on a health status rule; grouping the health status values, based on how many health status values are in the plurality of health status values, into a plurality of health status groups, wherein each of the health status groups includes a subset of the health status values, and wherein each of the health status values within each subset are related to each of the other health status values in the subset; and determining, for each of the health status groups, a group health status value.

16 Claims, 11 Drawing Sheets

(56) References Cited

U.S. PATENT DOCUMENTS

| | | | |
|---|---|---|---|
| 2011/0016423 A1* | 1/2011 | Brubaker | G06F 3/0481 |
| | | | 715/800 |
| 2015/0324712 A1* | 11/2015 | Agarwal | G06Q 10/06312 |
| | | | 705/7.22 |
| 2017/0104658 A1* | 4/2017 | Sykes | H04L 41/064 |
| 2018/0089272 A1* | 3/2018 | Bath | G06F 16/90335 |
| 2018/0091392 A1* | 3/2018 | Richards | H04L 12/4633 |
| 2018/0219754 A1 | 8/2018 | Udupi et al. | |
| 2018/0287902 A1* | 10/2018 | Chitalia | G06F 11/3006 |
| 2019/0238432 A1* | 8/2019 | Parag | H04L 41/12 |

OTHER PUBLICATIONS

U.S. Appl. No. 15/637,686, filed Jun. 29, 2017, entitled "Network Dashboard With Multifaceted Utilization Visualizations,".
U.S. Appl. No. 15/637,716, filed June. 29, 2017, entitled "Network Dasboard With Multifaceted Utilization Visualizations,".
Response to Extended Search Report dated Oct. 7, 2019, from counterpart European Application No. 19180810.4, filed Oct. 22, 2020, 12 pp.

* cited by examiner

US 10,911,336 B2

SCALABLE VISUALIZATION OF HEALTH DATA FOR NETWORK DEVICES

TECHNICAL FIELD

This disclosure relates to presenting information about performance, health, and/or operation of devices in data centers and/or networks.

BACKGROUND

As networks continue to proliferate, the ever-increasing number of network devices, each emitting data collectable by telemetry and other methods, has resulted in an overwhelming amount of data. At least some of this data may be considered to be key performance indicator (KPI) data that reflects the performance and/or other operational attributes relating to the operation of network devices. To assess the health and/or status of a network device (whether physical or virtual), one or more types of KPI data for that network device can be collected and analyzed. Analysis of KPI data may provide useful and insightful assessments of the current health or status of the network device, indicating that the network device is, for example, operating normally or poorly.

SUMMARY

This disclosure describes techniques that include generating and presenting visual information that conveys data about health statuses of a large number of network devices or a large number of attributes of one or more network devices. In some examples, such techniques may involve collecting data (e.g., KPIs or other metrics) about one or more network devices, determining health status values based on the collected data, and grouping logically-related sets of the health status values. A collective or composite group health status value may be determined for each of the groups, and each of the group health status values may be presented in a user interface as a display element that conveys (e.g., through color, shape, animation, or otherwise) information about the status of each group. In this way, the techniques may permit increasing the information presented to a user by dynamically scaling the display elements to encompass more health status values based on the number of respective attributes or network devices being analyzed.

The techniques described herein may provide certain technical advantages. For instance, by presenting data in a scalable, convenient, and meaningful way, an administrator may be able to easily and/or efficiently assess the status of a large system and identify performance indicators and rule-based health statuses to pinpoint problematic attributes of a system, network, or device. By efficiently identifying problematic areas, an administrator can configure or reconfigure systems, networks, and/or devices to rectify or improve the performance and efficiency of the affected or problematic areas, thereby resulting in a more productive system, network, and/or device.

In one example, this disclosure describes a method comprising collecting, by a computing system, performance indicator data for one or more network devices; determining, by the computing system, a plurality of health status values, wherein each of the health status values is determined based on one of a plurality of health status rules that assess a subset of the performance indicator data; grouping the health status values, by the computing system and based on how many health status values are in the plurality of health status values, into a plurality of health status groups, wherein each of the health status groups includes two or more health status values, and wherein each of the health status values within a health status group is related to each of the other health status values in the health status group; determining, by the computing system and for each of the health status groups, a group health status value, wherein the group health status value for each health status group is determined based on at least one of the health status values within the health status group; and outputting, by the computing system, a user interface that includes a display element for each of the health status groups, wherein each of the display elements provides a visual indication of the group health status value associated with each respective health status groups.

In another example, this disclosure describes a system comprising determine a plurality of health status values, wherein each of the health status values is determined based on one of a plurality of health status rules that assess a subset of the performance indicator data, group the health status values, based on how many health status values are in the plurality of health status values, into a plurality of health status groups, wherein each of the health status groups includes two or more health status values, and wherein each of the health status values within a health status group is related to each of the other health status values in the health status group, determine, for each of the health status groups, a group health status value, wherein the group health status value for each health status group is determined based on at least one of the health status values within the health status group, and output a user interface that includes a display element for each of the health status groups, wherein each of the display elements provides a visual indication of the group health status value associated with each respective health status groups.

In another example, this disclosure describes a computer-readable storage medium comprises instructions that, when executed, configure processing circuitry of a computing system to determine a plurality of health status values, wherein each of the health status values is determined based on one of a plurality of health status rules that assess a subset of the performance indicator data, group the health status values, based on how many health status values are in the plurality of health status values, into a plurality of health status groups, wherein each of the health status groups includes two or more health status values, and wherein each of the health status values within a health status group is related to each of the other health status values in the health status group, determine, for each of the health status groups, a group health status value, wherein the group health status value for each health status group is determined based on at least one of the health status values within the health status group, and output a user interface that includes a display element for each of the health status groups, wherein each of the display elements provides a visual indication of the group health status value associated with each respective health status groups.

DETAILED DESCRIPTION

Figure 1:
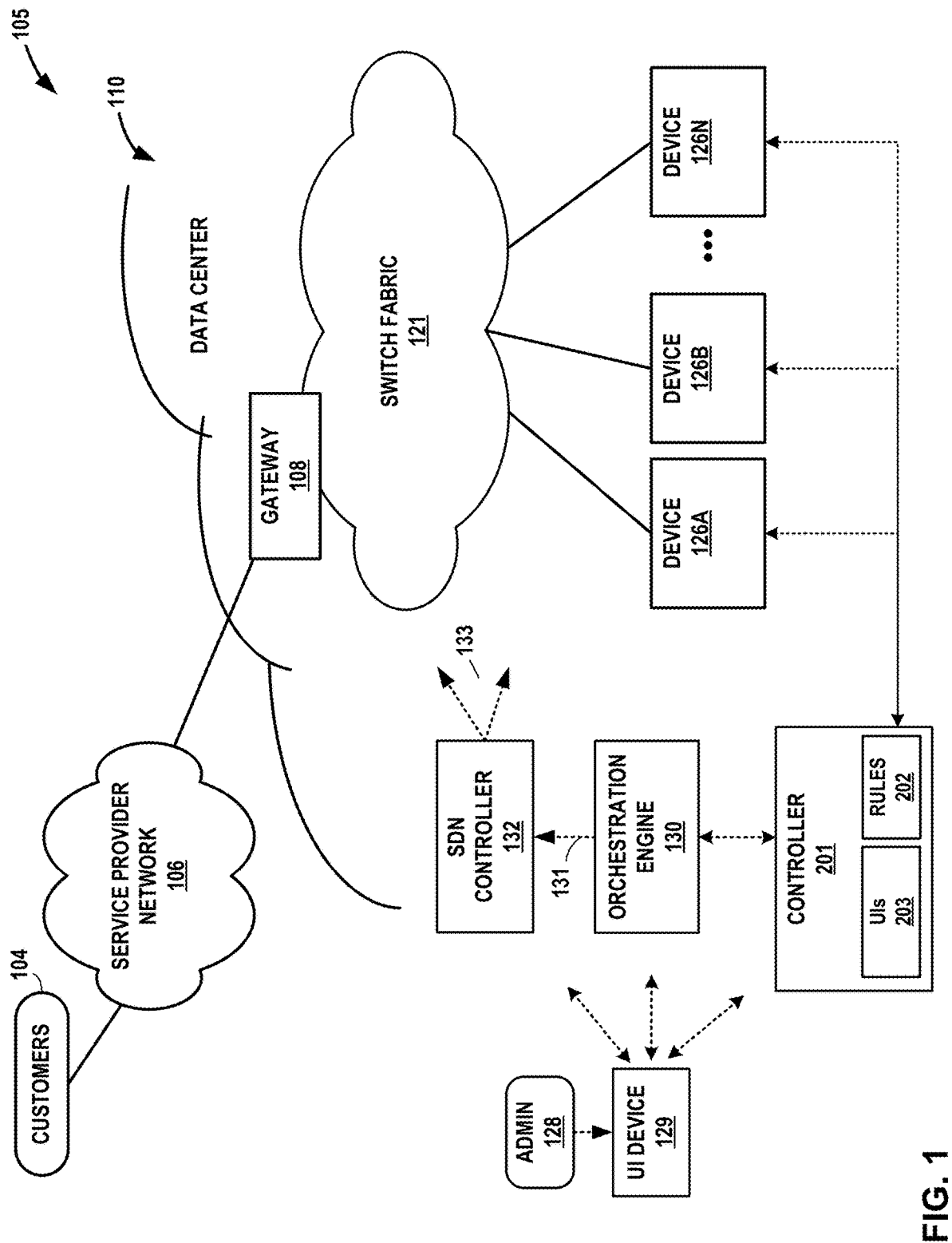
FIG. 1 is a conceptual diagram illustrating an example network that includes an example data center in which performance indicators for infrastructure elements for physical and cloud-based computing environments are monitored, in accordance with one or more aspects of the present disclosure.

With the availability of telemetry-enabled endpoints, large amounts of data emitted by network devices are available for consumption by monitoring and analytics solutions. Monitoring and analytics applications typically contain a dashboard, which may encompass a set of user interfaces that present a summarized view of the status of some or all the devices that the application is monitoring. To investigate the health of a particular device, an analysis of the key performance indicators or metrics associated with that device may be appropriate. Yet the number of key performance indicators (KPIs) being monitored for a given system, rack, or device can be as many as hundreds of thousands or more, depending on the KPI and system configuration as well as the granularity of KPI information.

One way to render or present status information associated with KPIs is through tables or lists where each KPI is added as an entry in the list with its status in a column. Such a presentation scheme might be effective when the list of KPIs is small, but when a system includes a scaled device/KPI combination, the same scheme could result in many pages of data. An administrator seeking information about a particular KPI for a specific device might be required to undertake a tedious process of scrolling through or otherwise navigating large amounts of data. It may be preferable to be able to monitor KPIs in a single view, without requiring excessive scrolling or data navigation to a find a suspect or problematic KPI. In addition, it may be preferable to be able to monitor the KPIs in a single view to be able to pinpoint attributes of a system or network device that have poor health statuses "at a glance." Accordingly, techniques are described herein for visualizing scaled KPI or metric data and other data that may be based on KPI or metric data.

In some examples, KPI data may be visualized on a per-device basis, or on the basis of a set of health status values that correspond to various devices. The health status values may be determined on the basis of captured KPI data and analysis of such KPI data that applies rules to the KPI data to generate the health status values. The rules might be organized hierarchically and/or by topic and applied to related KPIs to determine health statuses. For example, a rule might be associated with a topic called "interfaces" and may be applied to KPI data relating to the errors identified for a given interface. The rule might then determine a status of the interface based on the number of errors during a particular timeframe. The status determined by the rule might be represented by a number or a color that indicates a severity level associated with the status determined by the rule, and the number or color representing the status for each rule can be presented in a user interface for review by an administrator. For instance, in one example, the status values determined by the rules that are normal might be presented in a user interface with a green tile, and health status values corresponding to poor health might be presented in the user interface with a red tile. Health status values that are close to a poor health status value (or are at-risk of becoming poor health status values) might be presented with a yellow tile.

FIG. 1 is a conceptual diagram illustrating an example network 105 that includes an example data center 110 in which performance indicators for infrastructure elements for physical and cloud-based computing environments are monitored, in accordance with one or more aspects of the present disclosure. FIG. 1 illustrates one example implementation of network 105 and data center 110 that hosts one or more computing networks, computing domains or projects, and/or cloud-based computing networks generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 110 may be appropriate in other instances. Such implementations may include a subset of the components included in the example of FIG. 1 and/or may include additional components not shown in FIG. 1.

In the example of FIG. 1, data center 110 provides an operating environment for applications and services for customers 104 coupled to data center 110 by service provider network 106. Although functions and operations described in connection with network 105 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 110 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 110 may represent one of many geographically distributed network data centers. As illustrated in the example of FIG. 1, data center 110 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 110 is an individual network server, a network peer, or otherwise.

In the example of FIG. 1, data center 110 includes a set of storage systems, application servers, compute nodes, or other devices, including network device 126A through network device 126N (collectively "network devices 126," and representing any number of network devices). Devices 126 may be interconnected via high-speed switch fabric 121 provided by one or more tiers of physical network switches and routers. Network devices 126 may be any of a number of different types of devices, but in some examples, one or more devices 126 may serve as physical compute nodes of the data center. For example, one or more of devices 126 may provide an operating environment for execution of one or more customer-specific virtual machines 148 ("VMs" in FIG. 1) or other virtualized instances, such as containers. In such an example, one or more of devices 126 may be alternatively referred to as a host computing device or, more simply, as a host. A network device 126 may thereby execute one or more virtualized instances, such as virtual machines, containers, or other virtual execution environment for running one or more services, such as virtualized network functions (VNFs).

However, each of network devices 126 may be any type of device that may operate on a network and which may generate data accessible through telemetry or otherwise, which may include any type of computing device, sensor, camera, node, surveillance device, or other device. Further, some or all of network devices 126 may represent a component of another device, where such a component may generate data collectible through telemetry or otherwise. For example, some or all of network devices 126 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 110 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 110 and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 110 in accordance with one or more examples of this disclosure. In some examples, SDN controller 132 operates in response to configuration input received from orchestration engine 130 via northbound API 131, which in turn may operate in response to configuration input received from an administrator 128 interacting with and/or operating user interface device 129.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 201. In such examples, user interface device 129 may communicate with controller 201 over a network or other means of communication. In other examples, user interface device 129 may be a local peripheral of controller 201, or may be integrated into controller 201.

In some examples, orchestration engine 130 manages functions of data center 110 such as compute, storage, networking, and application resources. For example, orchestration engine 130 may create a virtual network for a tenant within data center 110 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and may allocate resources from devices 126 that serve as host devices to various applications via southbound API 133. That is, southbound API 133 represents a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g. TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

In the example of FIG. 1, data center 110 further includes a controller 201 that may provide monitoring functions for data center 110. For instance, controller 201 may monitor various key performance indicators associated with devices within network 105, including network devices 126. Controller 201 may perform monitoring in any of a number of ways. For instance, in one example, one or more of network devices 126 may expose telemetry data in various formats, and controller 201 may collect such data by establishing a connection to the relevant network device, choosing an available transport, and configuring the device to enable controller 201 to collect performance indicator data. In some examples, one or more of network devices 126 may use a telemetry interface (such as, for example, the Juniper Telemetry Interface, or JTI). Other methods that may be used for collecting performance indicator data or metrics from one or more network devices 126 include NETCONF, TCP, UDP, and others. Some of these methods for collecting data from network devices 126 may rely on a push model to deliver data asynchronously, without requiring polling of network devices 126. In such an example, a request to send data may be sent a single time by controller 201, thereby configuring network devices 126 to stream periodic updates. In some cases, such a method can be highly scalable and can support the monitoring of thousands of objects in a network.

In some examples, collection of performance indicators or metrics may rely on an agent module executing on each of network devices 126 for monitoring and data collection. In such an example, controller 201 interacts with monitoring agents that are deployed within at least some of the respective physical devices 126 for monitoring performance indicators, metrics, or resource usage statistics for network devices 126. In this way, monitoring agents may provide distributed mechanisms for collecting a wide variety of performance indicators or usage metrics. In some implementations, monitoring agents run on the lowest level "compute nodes" of the infrastructure of data center 110 that provide computational resources to execute application workload. A compute node may, for example, be a bare-metal host of device or server 126, a virtual machine executing on one more of network devices 126, a container or the like. More details about agent-based monitoring of metrics may be found in U.S. patent application Ser. No. 15/637,686, filed Jun. 29, 2017, entitled "Network Dashboard With Multifaceted Utilization Visualizations," and U.S. patent application Ser. No. 15/637,716, filed Jun. 29, 2017, entitled "Network Dashboard With Multifaceted Utilization Visualizations," the entire content of each of which is incorporated herein by reference.

Controller 201 obtains the performance indicators from network devices 126 (e.g., from monitoring agents, through a telemetry interface, or otherwise) and constructs one or more user interfaces to provide visibility into operational performance and infrastructure resources of data center 110, and network devices 126 specifically. Controller 201 may, for example, communicate one or more user interfaces 203 to UI device 129 for presentation to administrator 128 (e.g., using a display device). In addition, controller 201 may apply analytics and machine learning to the collected performance indicators to provide near or seemingly near real-time and historic monitoring, performance visibility and dynamic optimization to improve orchestration, security, accounting and planning within data center 110.

As shown in the example of FIG. 1, controller 201 may define and maintain a set of health status rules, or rules 202. Controller 201 may administer general monitoring and/or health status monitoring of each of network devices 126 based on the set of rules 202. Rules 202 may be created or derived in response to input by administrator 128 or in response to operations performed by controller 201. Controller 201 may, for example, observe operation of data center 110 over time and apply machine learning techniques to generate one or more rules 202. Controller 201 may periodically, occasionally, or continually refine rules 202 as further observations about data center 110 are made.

Controller 201 may be implemented as or within any suitable computing device, or across multiple computing devices. Controller 201, or components of controller 201, may be implemented as one or more modules of a computing device. In some examples, controller 201 may include a number of modules executing on a class of compute nodes (e.g., "infrastructure nodes") included within data center 110. Such nodes may be OpenStack infrastructure service nodes or Kubernetes master nodes, and/or may be implemented as virtual machines. In some examples, controller 201 may have network connectivity to some or all other compute nodes within data center 110, and may also have network connectivity to other infrastructure services that manage data center 110. Although described herein principally in terms of performing functions relating monitoring of key performance indicators, evaluating health status rules associated with such performance indicators, and generating user interfaces providing a visualization of health status values, controller 201 may perform other functions. For instance, in some examples, controller 201 may also provide scheduling, and performance management functions.

One or more rules 202 may define how values of key performance indicators monitored for network devices 126 translate into a health status value associated with a device. In some examples, one or more rules may be relatively complex, and may include formulas based on multiple metrics collected across multiple network devices 126. In some examples, each of rules 202 may be network-oriented, but may rely on or involve other types of performance indicators. Information collected by controller 201 and used for evaluating one or more rules 202 may include raw data, summary data, and sampling data as specified or required by one or more rules 202. In one example, a rule may define a normal interface as having no more than a certain number of errors during a given timeframe, and where the number of errors exceeds that number, the interface may be characterized as having an "at risk" status. If the number of errors is high enough, the status of an interface might be considered "poor."

User interfaces 203 may, in some examples, be a collection of user interfaces presenting information about the health status of many network devices 126 as defined by rules 202, about the health status of groups of devices, about key performance indicators or groups of key performance indicators, and/or other information. User interfaces 203 may include the user interfaces, or data underlying the user interfaces that are presented by user interface device 129. Each of user interfaces 203 may be created, updated, and/or maintained primarily by controller 201 or by a dashboard module executing on controller 201, or alternatively, by a combination of controller 201 and user interface device 129. User interfaces 203 and an associated user interface or visualization module may be collectively implemented through a software object instantiated in memory having associated data and/or executable software instructions that provide output data for rendering on a display.

User interface device 129 may detect interactions with user interfaces 203 as user input (e.g., from administrator 128). Controller 201 may, in response to user interactions with one or more user interfaces 203, cause modified user interfaces to be presented at user interface device 129. Further, such interactions may cause configurations to be made to aspects of data center 110 or applications or services executing on one or more network devices 126 of data center 110 relating to network resources, data transfer limitations or costs, storage limitations or costs, and/or accounting reports.

In the example of FIG. 1, and in accordance with one or more aspects of the present disclosure, controller 201 may monitor key performance indicators for one or more network devices 126. For instance, in the example of FIG. 1, controller 201 interacts with each of network devices 126 to configure each of network devices 126 to enable collection of key performance indicators, metrics, or other information from network devices 126. Based on the type of each of network devices 126 and/or the software executing on such network devices 126, controller 201 interacts with each of network devices 126 to create or establish a subscription or other data collection mechanism. Controller 201 may configure one or more of network devices 126 so that controller 201 may collect key performance indicator data through telemetry, through agent-based communication, through polling techniques, through push data collection techniques, and/or through any other means of collecting key performance indicator data for network devices 126. Controller 201 thereafter collects data continually, periodically, and/or occasionally from each of network devices 126. In some examples, controller 201 collects such data through direct connections with each of network devices 126, as illustrated in FIG. 1. In other examples controller 201 may collect such data through communications over switch fabric 121, or through other ways.

Controller 201 may generate data underlying one or more user interfaces that include health status information for network devices 126. For instance, in FIG. 1, controller 201 collects performance indicator data associated with network devices 126. Controller 201 analyzes the information about the collected data and constructs data underlying one or more user interfaces 203. Such user interfaces, when output to a display or other device, present health status information that is based on the collected key performance indicators. In some examples, the health status information is presented as a collection of display elements that each represent the result of a health status rule or rules applied to the key performance indicators. In some examples, the display elements are arranged within the user interfaces according to topics associated with one or more devices. Further, in some examples, controller 201 may generate user interfaces that include display elements representing groups of health status information or groups of health status values corresponding to multiple key performance indicators and/or multiple network devices 126. Controller 201 may group health status values to ensure that the number of display elements included within the user interface enables the health status information to be effectively presented. In some examples, controller 201 constructs user interfaces 203 so that the display elements within the user interfaces are sufficiently large so as to be easily seen and distinguishable from one another, and also, so that the display elements are not too numerous that the display elements cannot be presented within a single view (e.g. a single screen of information). By grouping health status information, controller 201 is able, in some examples, to achieve such objectives.

User interface device 129 may present user interfaces 203 to administrator 128. For instance, referring again to FIG. 1, controller 201 communicates the data underlying user interfaces 203 to user interface device 129. User interface device 129 uses the data to present one or more user interfaces at an output device (e.g., a display) associated with user interface device 129, thereby presenting health status information associated with network devices 126 to administrator 128.

Figure 2:
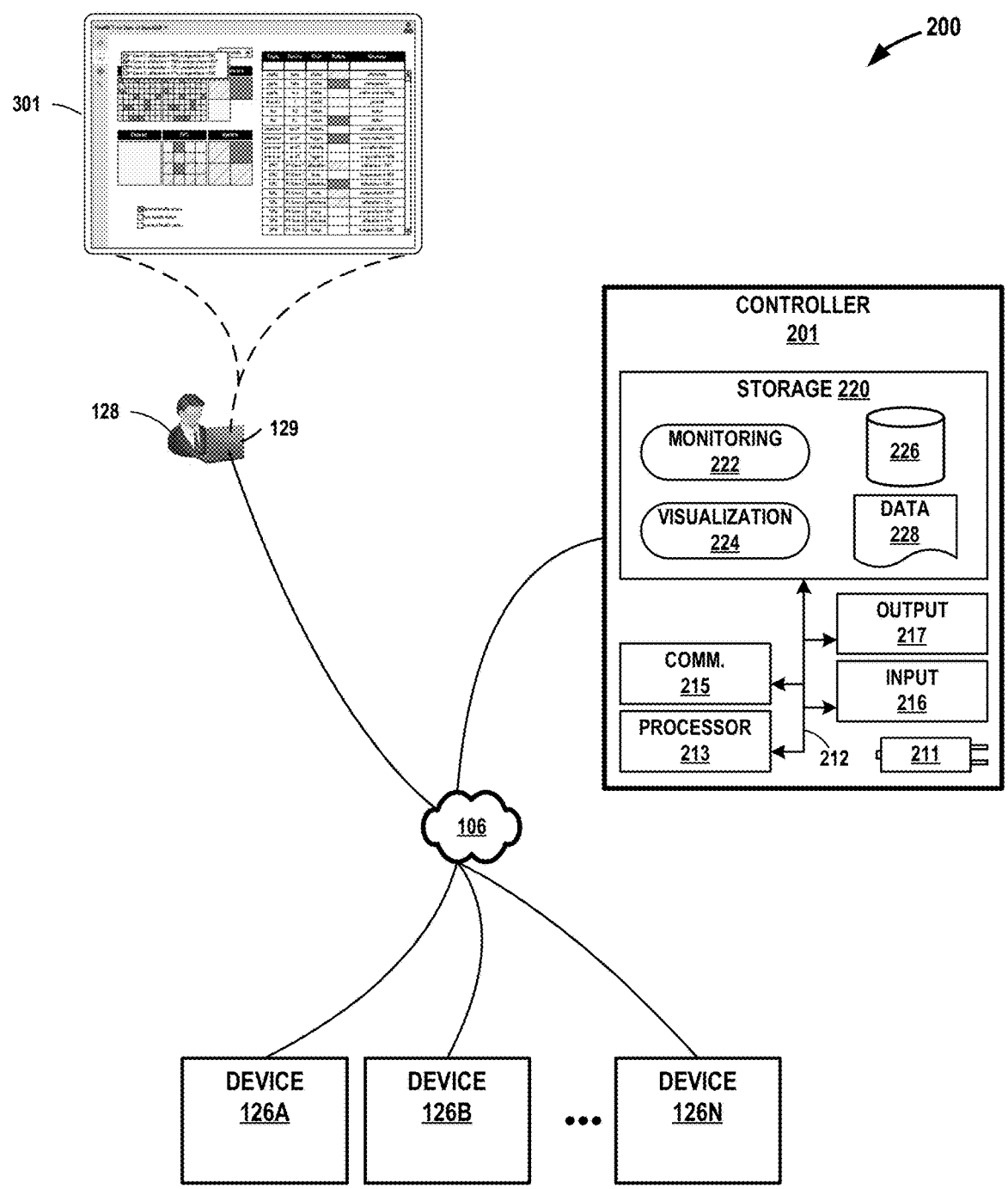
FIG. 2 is a block diagram illustrating an example system for collecting information about key performance indicators and presenting health status information based on the key performance indicators, in accordance with one or more aspects of the present disclosure.

FIG. 2 is a block diagram illustrating an example system for collecting information about key performance indicators and presenting health status information based on the key performance indicators, in accordance with one or more aspects of the present disclosure. System 200 of FIG. 2 may be described as an example or alternative implementation of network 105 of FIG. 1. One or more aspects of FIG. 2 may be described herein within the context of FIG. 1.

In the example of FIG. 2, system 200 includes controller 201, network 106, and one or more network devices 126 (corresponding to network device 126A through 126N in FIG. 2, and representing any number of network devices), and user interface device 129 (which may be operated by administrator 128, and may present user interface 301). For ease of illustration, one controller 201, one network 106, and a limited number of network devices 126 are illustrated in FIG. 2, although techniques in accordance with one or more aspects of the present disclosure may be performed with many more of such systems.

Also, in FIG. 2, controller 201 and administrator 128 may each correspond to like-numbered elements of FIG. 1. These devices, systems, and/or components may be implemented in a manner consistent with the description of the corresponding system provided in connection with FIG. 1, although in some examples such systems may involve alternative implementations with more, fewer, and/or different capabilities. In general, systems, devices, components, user interface elements, and other items in Figures herein may correspond to like-numbered systems, devices, components, and items illustrated in other Figures, and may be described in a manner consistent with the description provided in connection with other Figures.

Network 106 of FIG. 2 may correspond to network 105 of FIG. 1, switch fabric 121 of FIG. 1, or a combination of network 105 and switch fabric 121 of FIG. 1. In other examples, network 105 may encompass other networks, which may include the internet, or may include or represent any public or private communications network or other network. For instance, network 106 may include or encompass a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 106 using any suitable communication techniques. Network 106 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 106 using one or more network links. The links coupling such devices or systems to network 106 may be Ethernet, Asynchronous Transfer Mode (ATM) or other types of network connections, and such connections may be wireless and/or wired connections. One or more of the devices or systems illustrated in FIG. 2 or otherwise on network 106 may be in a remote location relative to one or more other illustrated devices or systems.

Controller 201 represents a physical computing device or compute node that provides an execution environment for virtual hosts, virtual machines, containers, and/or other virtualized computing resources. In some examples, controller 201 may be a component of a cloud computing system, server farm, and/or server cluster (or portion thereof) that provides services to client devices and other devices or systems. Although primarily described herein as a physical computing device, host 270 may, in other examples, itself be implemented as a virtualized computing device (e.g., as a virtual machine or container).

In the example of FIG. 2, controller 201 includes underlying physical compute hardware that includes power source 211, one or more processors 213, one or more communication units 215, one or more input devices 216, one or more output devices 217, and one or more storage devices 220. Storage devices 220 may include monitoring module 222, visualization module 224, data store 226, and visualization data 228. One or more of the devices, modules, storage areas, or other components of controller 201 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of controller 201. Power source 211 may receive power from the primary alternating current (AC) power supply in a building, data center, or other location. In other examples, power source 211 may be a battery or a device that supplies direct current (DC). In still further examples, controller 201 and/or power source 211 may receive power from another source. One or more of the devices or components illustrated within controller 201 may be connected to power source 211, and/or may receive power from power source 211. Power source 211 may have intelligent power management or consumption capabilities, and such features may be controlled, accessed, or adjusted by one or more modules of controller 201 and/or by one or more processors 213 to intelligently consume, allocate, supply, or otherwise manage power.

One or more processors 213 of controller 201 may implement functionality and/or execute instructions associated with controller 201 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Central monitoring system 210 may use one or more processors 213 to perform operations in accordance with one or more aspects of the present disclosure using software, hardware, firmware, or a mixture of hardware, software, and firmware residing in and/or executing at controller 201.

One or more communication units 215 of controller 201 may communicate with devices external to controller 201 by transmitting and/or receiving data, and may operate, in some respects, as both an input device and an output device. In some examples, communication unit 215 may communicate with other devices over a network. In other examples, communication units 215 may send and/or receive radio signals on a radio network such as a cellular radio network. In other examples, communication units 215 of controller 201 may transmit and/or receive satellite signals on a satellite network such as a Global Positioning System (GPS) network. Examples of communication units 215 include a network interface card (e.g. such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 216 may represent any input devices of controller 201 not otherwise separately described herein. One or more input devices 216 may generate, receive, and/or process input from any type of device capable of detecting input from a human or machine. For example, one or more input devices 216 may generate, receive, and/or process input in the form of electrical, physical, audio, image, and/or visual input (e.g., peripheral device, keyboard, microphone, camera).

One or more output devices 217 may represent any output devices of controller 201 not otherwise separately described herein. One or more output devices 217 may generate, receive, and/or process input from any type of device capable of detecting input from a human or machine. For example, one or more output devices 217 may generate, receive, and/or process output in the form of electrical and/or physical output (e.g., peripheral device, actuator).

One or more storage devices 220 within controller 201 may store information for processing during operation of controller 201. Storage devices 220 may store program instructions and/or data associated with one or more of the modules described in accordance with one or more aspects of this disclosure. One or more processors 213 and one or more storage devices 220 may provide an operating environment or platform for such modules, which may be implemented as software, but may in some examples include any combination of hardware, firmware, and software. One or more processors 213 may execute instructions and one or more storage devices 220 may store instructions and/or data of one or more modules. The combination of processors 213 and storage devices 220 may retrieve, store, and/or execute the instructions and/or data of one or more applications, modules, or software. Processors 213 and/or storage devices 220 may also be operably coupled to one or more other software and/or hardware components, including, but not limited to, one or more of the components of controller 201 and/or one or more devices or systems illustrated as being connected to controller 201.

In some examples, one or more storage devices 220 are temporary memories, meaning that a primary purpose of the one or more storage devices is not long-term storage. Storage devices 220 of controller 201 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 220, in some examples, also include one or more computer-readable storage media. Storage devices 220 may be configured to store larger amounts of information than volatile memory. Storage devices 220 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Monitoring module 222 may perform functions relating to collecting key performance indicators and/or metrics from one or more network devices (e.g., network devices 126) for the purpose of determining information about the health status of such network devices. Monitoring module 222 may interact with one or more network devices 126 to establish a subscription or data collection procedure or protocol, which may include use of a telemetry interface (e.g., JTI), NETCONF, TCP, UDP, or other mechanisms. Monitoring module 222 may alternatively, or in addition, collect performance indicators and/or metrics in an agent-based data collection scheme, whereby controller 201 receives, from one or more agents executing on network devices 126, information that includes performance indicator data or metrics information. In such an example, aspects of monitoring module 222 may be included within such agents executing on network devices 126, so in some implementations, monitoring module 222 may be distributed across controller 201 and network devices 126. Monitoring module 222 may receive collected performance indicators and/or metrics over network 106 and may store collected performance indicator or metrics information in data store 226. Monitoring module 222 may also output data to visualization module 224 for the purpose of generating a visualization based on the performance indicator or metrics information. In some examples, functions performed by monitoring module 222 could be performed by software or by a hardware device executing software. In other examples, functions performed by monitoring module 222 may be implemented primarily or partially through hardware.

Visualization module 224 may perform functions relating to generating user interfaces (or data underlying such user interfaces) that include visualizations of health status information associated with a system, network, device, or a group of systems, networks, and/or devices. Visualization module 224 may receive, from monitoring module 222 and/or data store 226, information about key performance indicators or metrics. Visualization module 224 may analyze such information and apply health status rules to determine a health status value associated with a key performance indicator or a health status rule. Visualization module 224 may determine, based on the number of health status rules to present to an administrator, that effectively presenting information about the health status of a system may require that certain health status values corresponding to one or more key performance indicators should be grouped together and presented as a single display element or visual indicator (or a small number of display elements or visual indicators) in a user interface. Visualization module 224 may generate information underlying a user interface (e.g., visualization data 228) that can be used by a user interface device (e.g., user interface device 129) to present a visualization of health status information on a display.

Visualization data 228 may include information derived from information received in communications with one or more network devices 126, and may include information underlying a visualization of key performance indicators, metrics, or health status values associated with health status rules. Visualization data 228 may be created or updated by visualization module 224 when generating user interfaces presenting health status information. Visualization data 228 may include information about groups of health status values that should be presented together in a user interface for the purpose of efficiently communicating health status information for a large number of devices, key performance indicators, and/or health status rules.

Data store 226 may represent any suitable data structure or storage medium for storing information related to key performance indicators and/or metrics associated with various network devices (e.g., network device 126). Data store 226 may further store information about health status rules that may be applied to key performance indicators to generate health status values or groups of health status values. The information stored in data store 226 may be searchable and/or categorized such that one or more modules within controller 201 may provide an input requesting information from data store 226, and in response to the input, receive information stored within data store 226. Data store 226 may be primarily maintained by monitoring module 222. Data store 226 may provide other modules with access to the data stored within data store 226, and/or may analyze the data stored within data store 226 and output such information on behalf of other modules of controller 201.

Modules illustrated in FIG. 2 (e.g., monitoring module 222 and visualization module 224) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3A:
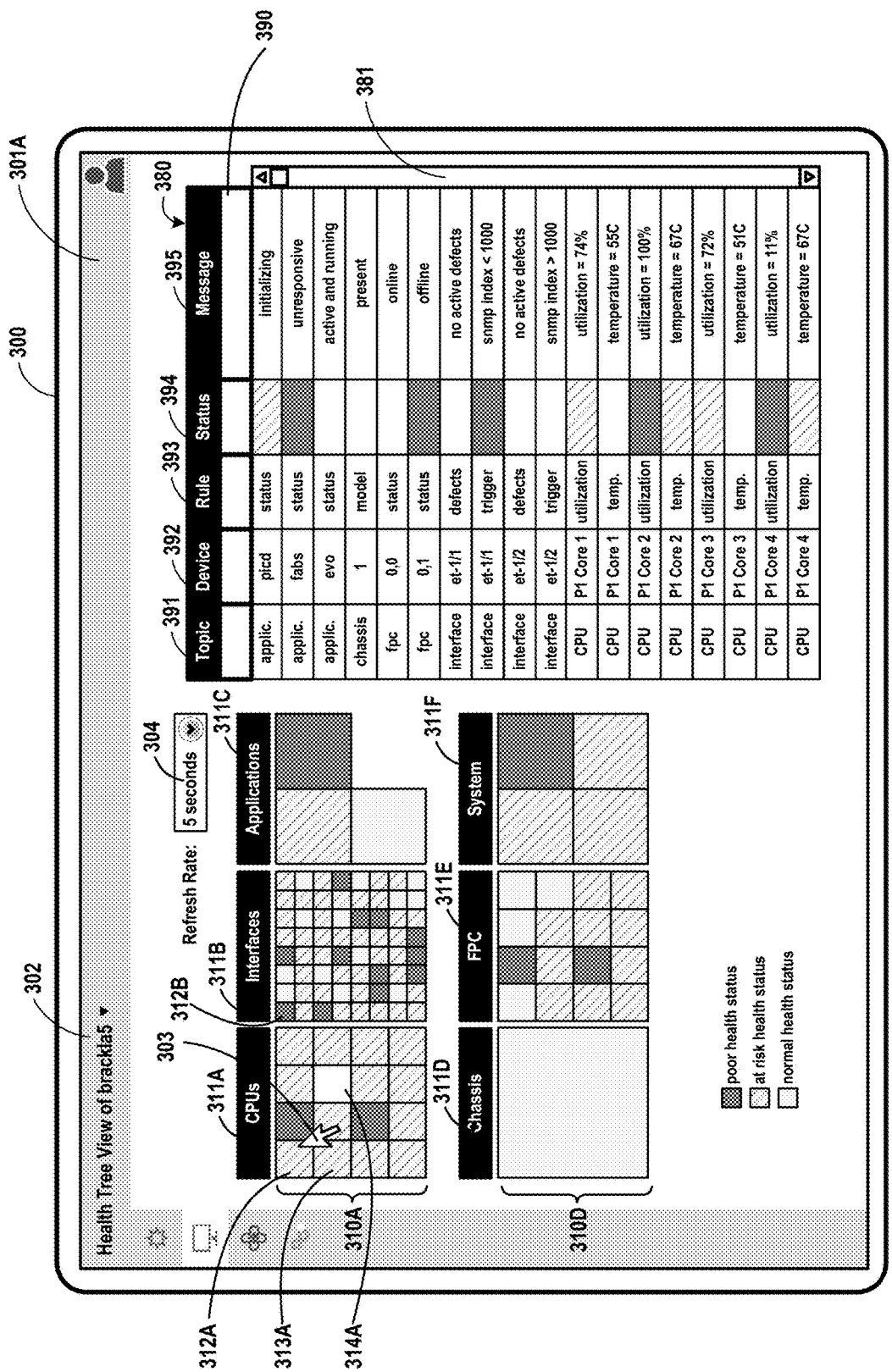
FIG. 3A is an example user interface illustrating a visualization of data collected from devices on a network, in accordance with one or more aspects of the present disclosure.
Figure 3B:
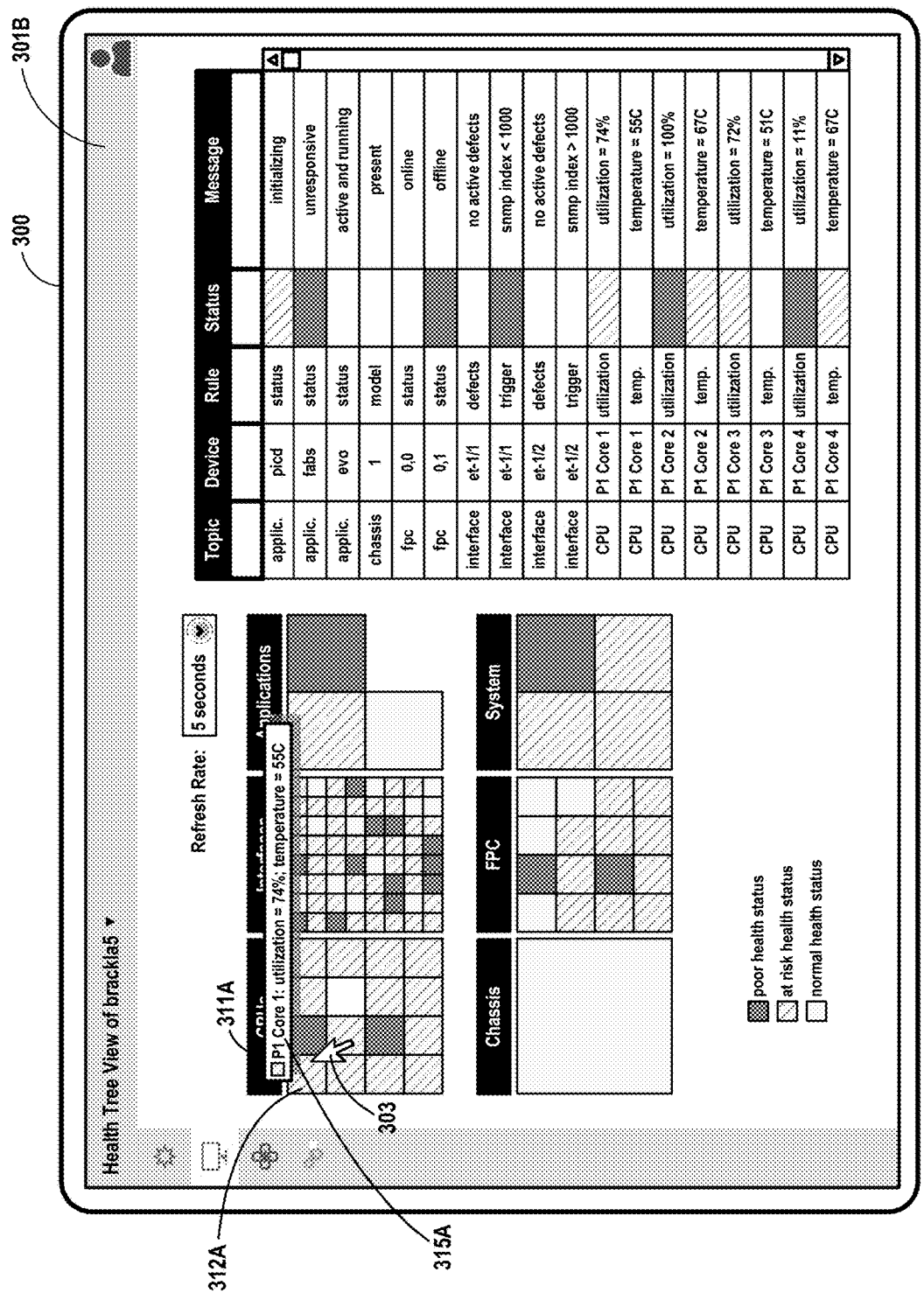
FIG. 3B is an example user interface illustrating a popup window that provides details about a display element shown within the user interface of FIG. 3A, in accordance with one or more aspects of the present disclosure.
Figure 3C:
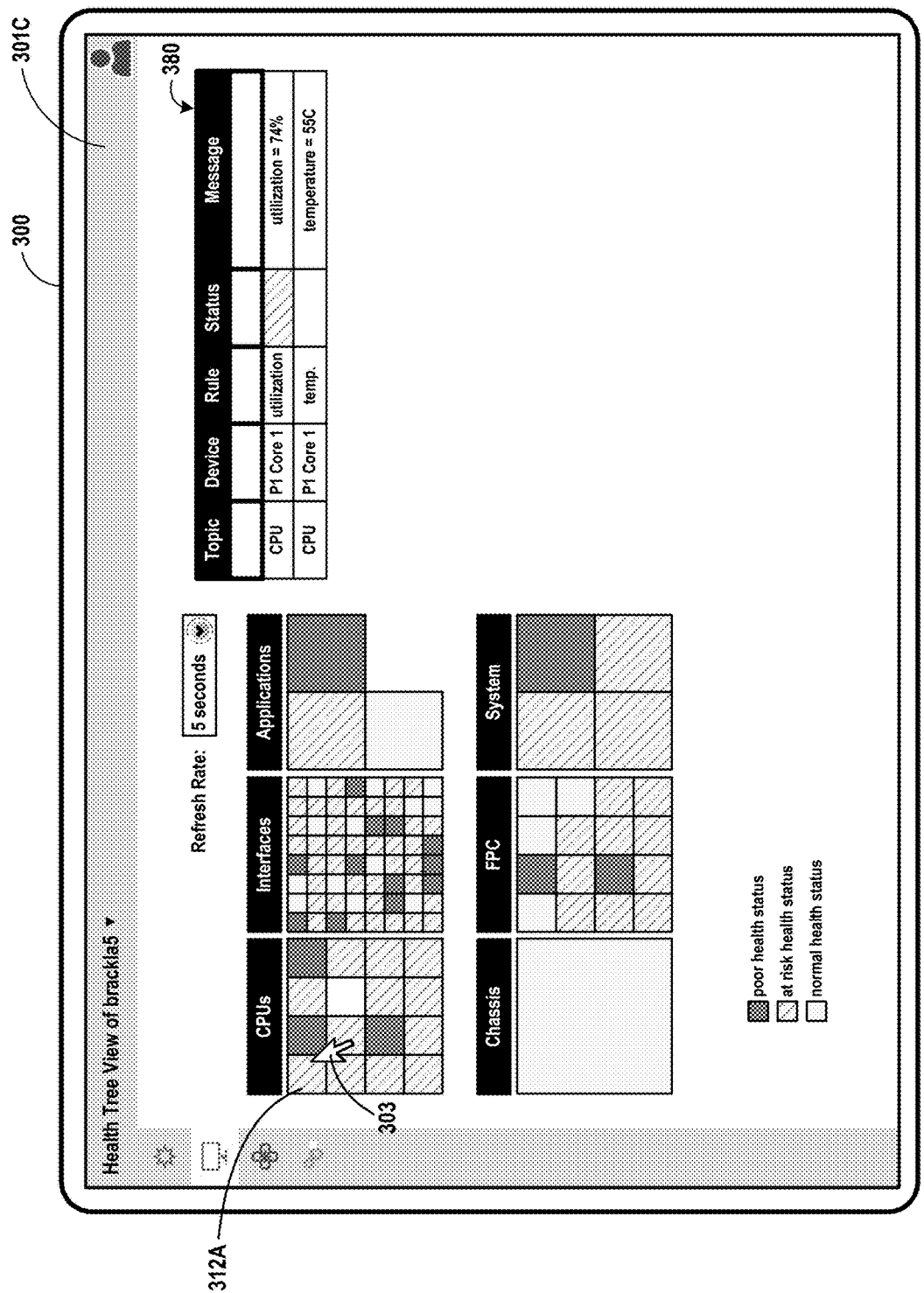
FIG. 3C is an example user interface illustrating a filtering of information presented within a user interface in response to user input, in accordance with one or more aspects of the present disclosure.

FIG. 3A, FIG. 3B, and FIG. 3C are conceptual diagrams illustrating example user interfaces presented by a user interface device in accordance with one or more aspects of the present disclosure. User interface 301A, as illustrated in FIG. 3A, may correspond to a user interface presented by user interface device 129 of FIG. 1 and/or FIG. 2, and may present information about health status or other information about one or more network devices 126 as illustrated in FIG. 1 and/or FIG. 2. Although the user interfaces illustrated in FIG. 3A through FIG. 3C are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 3A, FIG. 3B, and FIG. 3C may be described herein within the context of system 200 of FIG. 2.

FIG. 3A is an example user interface illustrating a visualization of data collected from devices on a network, in accordance with one or more aspects of the present disclosure. User interface 301A of FIG. 3A may be presented by display device 300, which may be associated with user interface device 129 of FIG. 2. For instance, with reference to an example that can be described in the context of FIG. 2, monitoring module 222 of controller 201 configures each network devices 126 to enable controller 201 to monitor performance data (e.g., key performance indicators) for network devices 126. Thereafter, communication unit 215 detects a series of signals over network 106 and outputs to monitoring module 222 a series of indications of signals. Monitoring module 222 determines that the signals include data associated with network devices 126. Monitoring module 222 stores such data in data store 226. Monitoring module 222 continually, periodically, and/or occasionally outputs to visualization module 224 information about the collected data. Visualization module 224 analyzes the information about the collected data and/or accesses additional information within data store 226. Some of the information visualization module 224 accesses within data store 226 may include information about rules to apply to the collected data and information about how to interpret the collected data and translate the data into categories of health status values. Visualization module 224 uses the information and the stored data from data store 226 to construct visualization data 228 underlying a user interface. Visualization module 224 causes communication unit 215 to output a signal over network 106. User interface device 129 detects a signal over network 106 and determines that the signal includes information sufficient to present a user interface. User interface device 129 presents user interface 301A at display device 300 as illustrated in FIG. 3A.

In FIG. 3A, user interface 301A includes a number of display element sets 310, each arranged under a corresponding topic header 311. For example, display element set 310A is shown in FIG. 3A arranged under topic header 311A, display element set 310D is shown arranged under topic header 311D. Similarly, under each of topic headers 311B, 311C, 311E, and 311F, other display element sets are illustrated (but not specifically labeled). Each of display element sets 310 include a variable number of display elements, depending on the number of health statuses are associated with each topic. For example, display element set 310A includes sixteen display elements, including display element 312A, display element 313A, and display element 314A.

In the example of FIG. 3A, the size of each of display elements depends on the total number of display elements (e.g., corresponding to rules interpreting KPI) under a given topic. In some examples, when the total number of display elements does not cross a given threshold amount or quantity, controller 201 represents each display element as a single tile in a square block (e.g., display element sets 310), where each tile illustrated by a color, pattern, or other indication, corresponds to the status of the rule associated with the display element. Although health status value indications are described herein primarily with reference to different colors, display elements may provide visual indications of health status values using other visual indications, such as patterns, values (e.g., integers), words (e.g., "good", "poor"), three-dimensional glyphs, shapes, and so forth. When the number of display elements is larger than a threshold quantity of display elements, controller 201 may group health status values associated with the display elements, and display one display element for each group. The color of the tile corresponding to a group of health status values will, in some examples, depend on the status of each of the members of the group. If there is any member of the group that has an "at risk" or "poor health status" value, the color of the group tile will, in some examples, indicate such status so that the visualization presented by the user interface tends to capture the attention of an administrator, and alert the administrator of the least favorable health statuses. If all the instances of health status within in a group are normal, controller 201 may configure the user interface so that the group tile associated with the group will be marked or illustrated in a manner consistent with a normal health status.

In the example of FIG. 3A, topic header 311A may correspond to a system with four processors, each processor having four cores. Accordingly, each of the sixteen display elements shown within display element set 310A under topic header 311A may correspond to a core within each of the four processors. The color of the display element corresponding to each core represents the health of that core, based on a rule applied to key performance indicators or metrics for processor cores. Display element set 310D, on the other hand, includes only a single display element. Each of display elements shown within display element sets 310 presents health status information about a device, component, or set of devices or components within the context of a selected network, network rack, system, and/or other device. In FIG. 3A, context selector 302 enables a user to change and/or select the context for the information displayed within user interface 301A. For instance, user interface 301A may present information about devices or components within a rack of devices named "brackla5" in FIG. 3A. However, user interface device 129 may present, in response to an interaction with context selector 302, information about a different set of devices that might be included in a different rack. Refresh rate selector 304 may enable adjustments to the rate at which user interface 301A is updated.

Table 380, also illustrated in user interface 301A of the example of FIG. 3A, presents information corresponding to the displayed topic headers 311 and display element sets 310. Table 380 includes table header 390, which includes topic column 391, device column 392, rule column 393, status column 394, and message column 395. Table 380 can be manipulated in response to user input in a number of ways. For example, user interface device 129 may update table 380 in response to scroll bar 381 interactions, and present additional and/or different information into view.

Controller 201 (or user interface device 129) may also update table 380, by sorting columns of table 380, in response to user input (e.g., selection of a column with cursor 303). Controller 201 (or user interface device 129) may also update table 380, by filtering rows displayed within table 380, in response to user input entering text into one or more boxes under each column header of table header 390. For example, typing "CPU" into the box under topic column 391 may filter table 380 so that only rows having "CPU" as a topic are displayed. Controller 201 (or user interface device 129) may also generate an updated table 380 in response to input selecting one or more of topic headers 311. For instance, in response to a selection of topic header 311A (e.g., using cursor 303), user interface device 129 may present within table 380 only that information relating to the "CPUs" topic. Alternatively, in response to a selection of topic header 311B, controller 201 (or user interface device 129) may present within table 380 only that information relating to the "interfaces" topic.

FIG. 3B is an example user interface illustrating a popup window that provides details about a display element shown within the user interface of FIG. 3A, in accordance with one or more aspects of the present disclosure. User interface 301B of FIG. 3B may be presented at display device 300 in response to input indicating that cursor 303 has been moved over display element 312A in FIG. 3A. For instance, with reference to FIG. 2 and FIG. 3A, user interface device 129 detects input and outputs a signal over network 106. Communication unit 215 of controller 201 detects a signal and outputs to visualization module 224 an indication of a signal. Visualization module 224 determines that the signal corresponds to an indication that cursor 303 has been moved over display element 312A. Visualization module 224 causes communication unit 215 to output a signal over network 106. User interface device 129 detects a signal and determines that the signal includes information to update user interface 301A. User interface device 129 updates user interface 301A to include popup window 315A, and presents user interface 301B at display device 300 as illustrated in FIG. 3B.

In FIG. 3B, popup window 315A includes further detail relating to the information presented by display element 312A. In the example shown, display element 312A corresponds to core 1 within processor 1 for a given device included in system 200. In one example, core 1 within processor 1 might correspond to a core within a processor included within network device 126A. In the example of FIG. 3A and FIG. 3B, two rules are associated with core 1 of processor 1. The first rule corresponds to utilization of the core (74% in this example), and the second rule corresponds to the temperature of the core (55 C). The information associated with each of these two rules is presented within popup window 315A in FIG. 3B. Although popup window 315A is described in this example as being presented in response to communication by user interface device 129 with controller 201 after cursor 303 is moved over topic header 311A, in other examples, popup window 315A may be presented in other ways, including as a result of local processing of user input at user interface device 129 (i.e., which might not require communication with controller 201 over network 106).

FIG. 3C is an example user interface illustrating a filtering of information presented within a user interface in response to user input, in accordance with one or more aspects of the present disclosure. User interface 301C of FIG. 3C may be presented at display device 300 in response to input selecting display element 312A (e.g., using cursor 303) in FIG. 3B. For instance, with reference to FIG. 2 and FIG. 3B, user interface device 129 detects input and outputs a signal over network 106. Communication unit 215 of controller 201 detects a signal that visualization module 224 determines corresponds to an indication that display element 312A has been selected (e.g., using cursor 303) within user interface 301B. Visualization module 224 causes communication unit 215 to output a signal over network 106 that user interface device 129 determines includes information sufficient to update user interface 301B. User interface device 129 updates user interface 301B to modify the data presented within table 380, and presents user interface 301C at display device 300 as illustrated in FIG. 3C.

In FIG. 3C, table 380 has been filtered, in response to selection of display element 312A, to include only those rows associated with display element 312A. Table 380 thereby presents much of the same information included within popup window 315A of FIG. 3B, and includes health status information corresponding to utilization of core 1 of processor 1 and the temperature of core 1 processor 1. Again, although table 380 is described as being updated in response to communication by user interface device 129 with controller 201 after user input selecting display element 312A is detected, in other examples, table 380 may be updated in other ways, including as a result of local processing of user input at user interface device 129.

Figure 4:
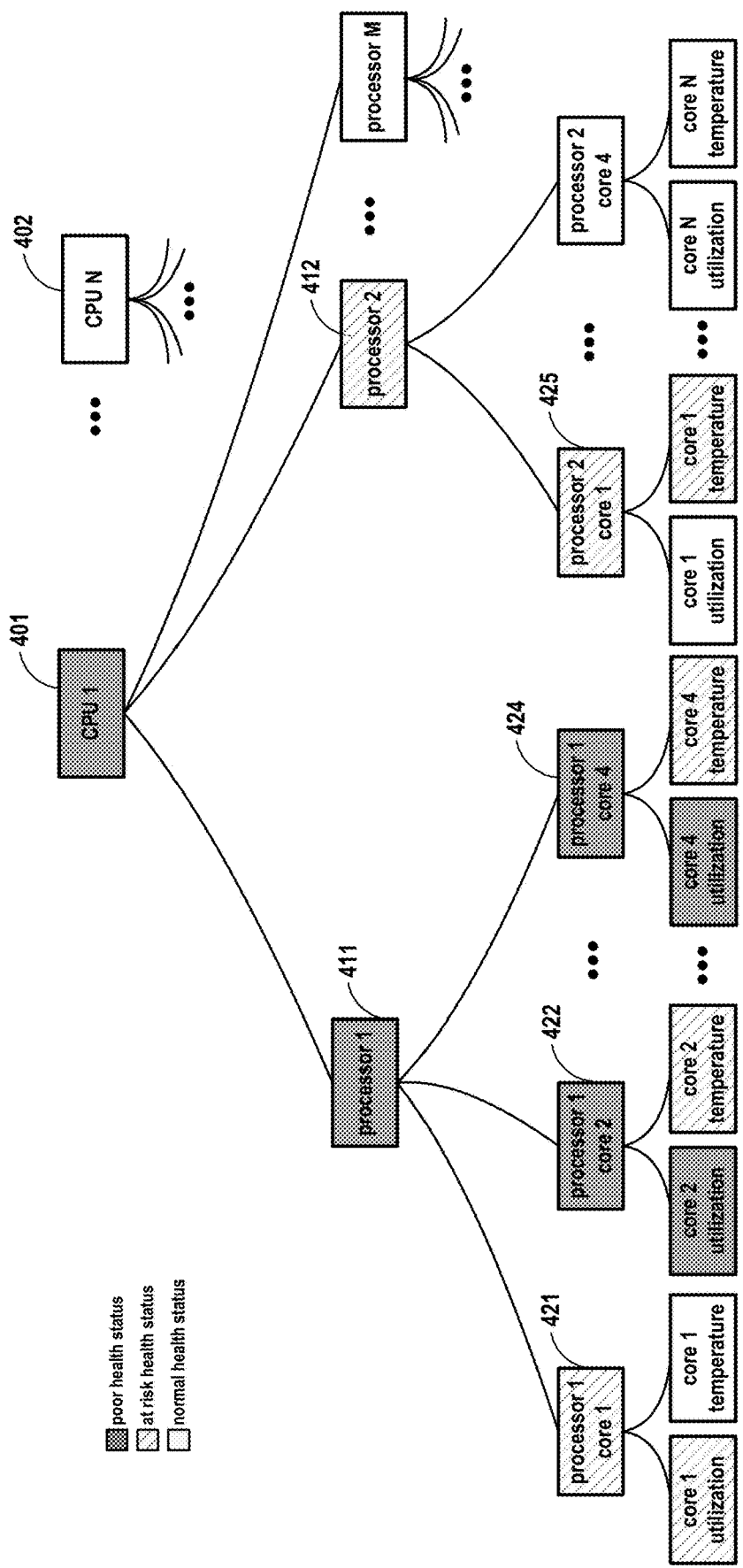
FIG. 4 is a conceptual diagram illustrating an example hierarchical data model for collected key performance indicators.

FIG. 4 is a conceptual diagram illustrating an example hierarchical data model for collected key performance indicators. FIG. 4 illustrates data model topic tree 400, which may be one possible data model for the CPU topic illustrated in FIG. 3A through FIG. 3C, corresponding to the display element set 310A presented under topic header 311A of FIG. 3A. In the example shown in FIG. 4, the health of each CPU within a system can be defined by the health of its components, children, or attributes (e.g. utilization). For instance, each CPU (e.g., node 401, node 402) may include M number of processors (represented by node 411, node 412, etc.), and each processor may include four cores (e.g., represented by nodes 421 through 424 for processor 1). Each core may have performance indicator data enabling multiple health status values to be determined for each core. In the example shown in FIG. 4, each core has two health status values: one for core utilization and another for core temperature. A rule applied to the performance indicators (i.e., core utilization and core temperature) can be used to determine a health status associated with each such performance indicator.

The health of core 1 of processor 1 might be defined by its utilization and temperature health status values. In the example of FIG. 4, the temperature of core 1 of processor 1 is "normal," but the utilization is shown as "at risk." Accordingly, the health status value associated with node 421 might be considered "at risk," because that is the least favorable health status value of the child nodes under the node 421. Similarly, both node 422 and node 424 are illustrated as having "poor health status," because both cores associated with those nodes have utilization that is shown as indicating "poor health status" In a similar manner, the health status of node 411 might also be considered poor in examples where processor nodes inherit the least favorable health status of its attributes, since child nodes 422 and 424 both have poor health status. A similar methodology also assigns a "poor health status" to node 401, since node 411 is a child of node 401, and node 411 has a poor health status.

The hierarchy of FIG. 4 illustrates, for one category (or "topic") of KPIs, one methodology for assigning a group health status value to parent nodes based on the health status values of child nodes. Other topics may have similar or corresponding data model topic trees. Accordingly, by using one or more data model topic trees 400 as illustrated in FIG. 4, controller 201 may group sets of logically-related devices or health status values together, and determine appropriate health status values for the group. Health status values may be logically-related in the sense illustrated or described in connection with FIG. 4, and/or may also be logically-related based on the type of device, type of performance indicator or metric information collected, or based on any other relationship. A useful user interface may be constructed using the health status values for higher level nodes as group health status values (e.g., encompassing child nodes) in situations where there are too many individual health status values (too many nodes below the level of nodes 421, 422, 424, 425, etc.) to practically or efficiently present information about each of those health status values in a single-pane user interface.

Figure 5A:
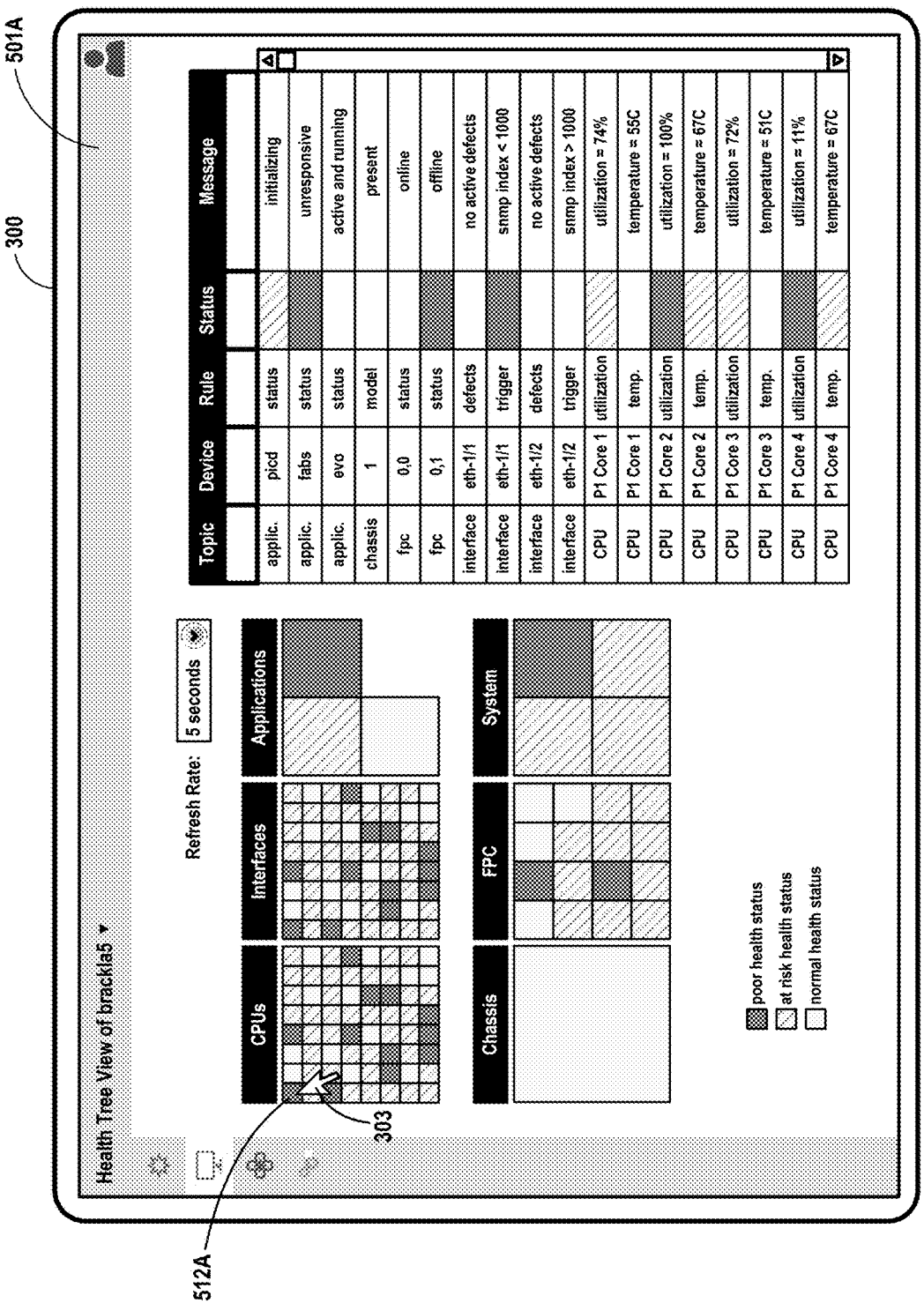
FIG. 5A is an example user interface illustrating visualizations of data collected from groups of devices on a network, in accordance with one or more aspects of the present disclosure.
Figure 5B:
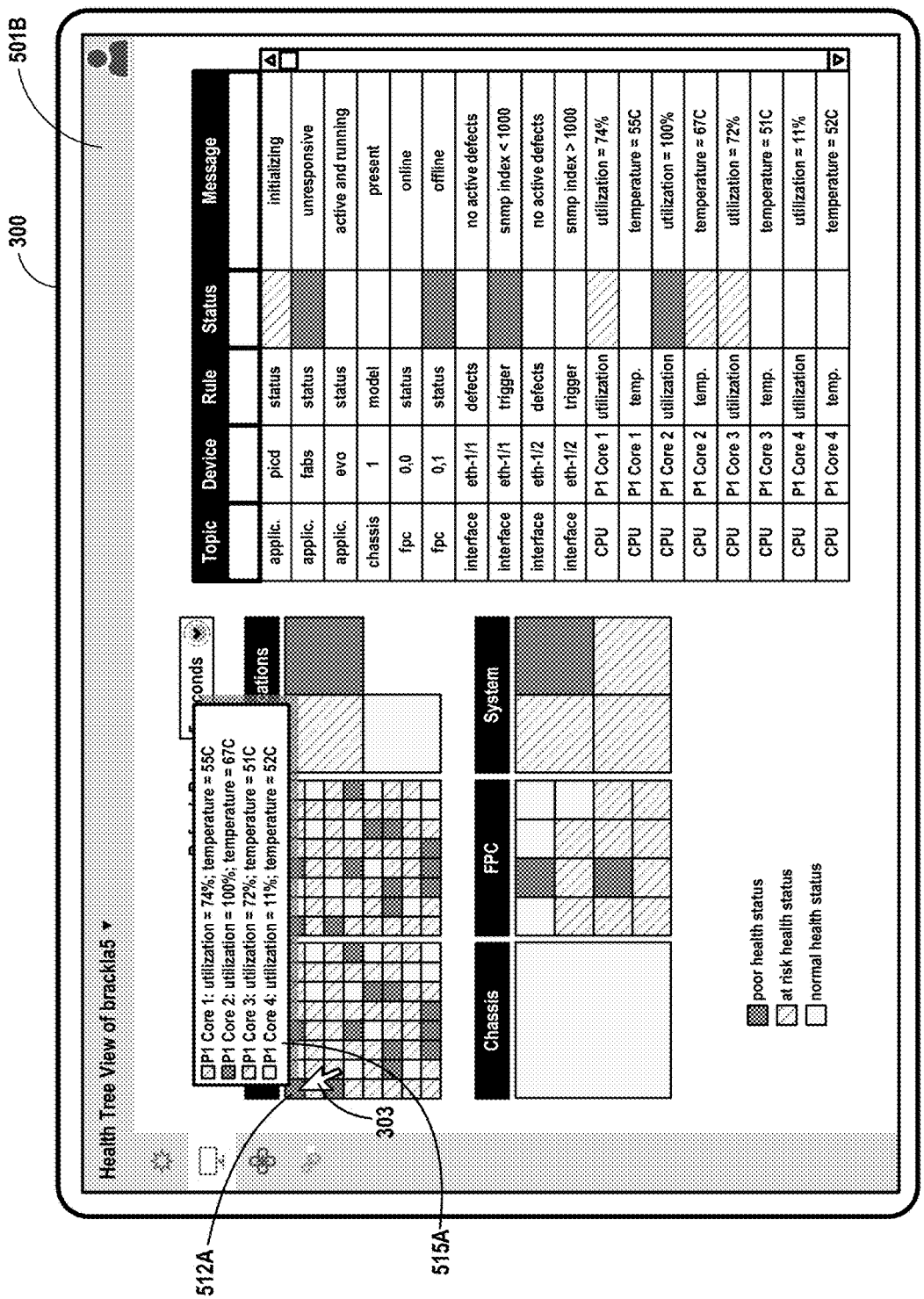
FIG. 5B is an example user interface illustrating a popup window that provides details about one of the display elements illustrated within the user interface of FIG. 5A, in accordance with one or more aspects of the present disclosure.
Figure 5C:
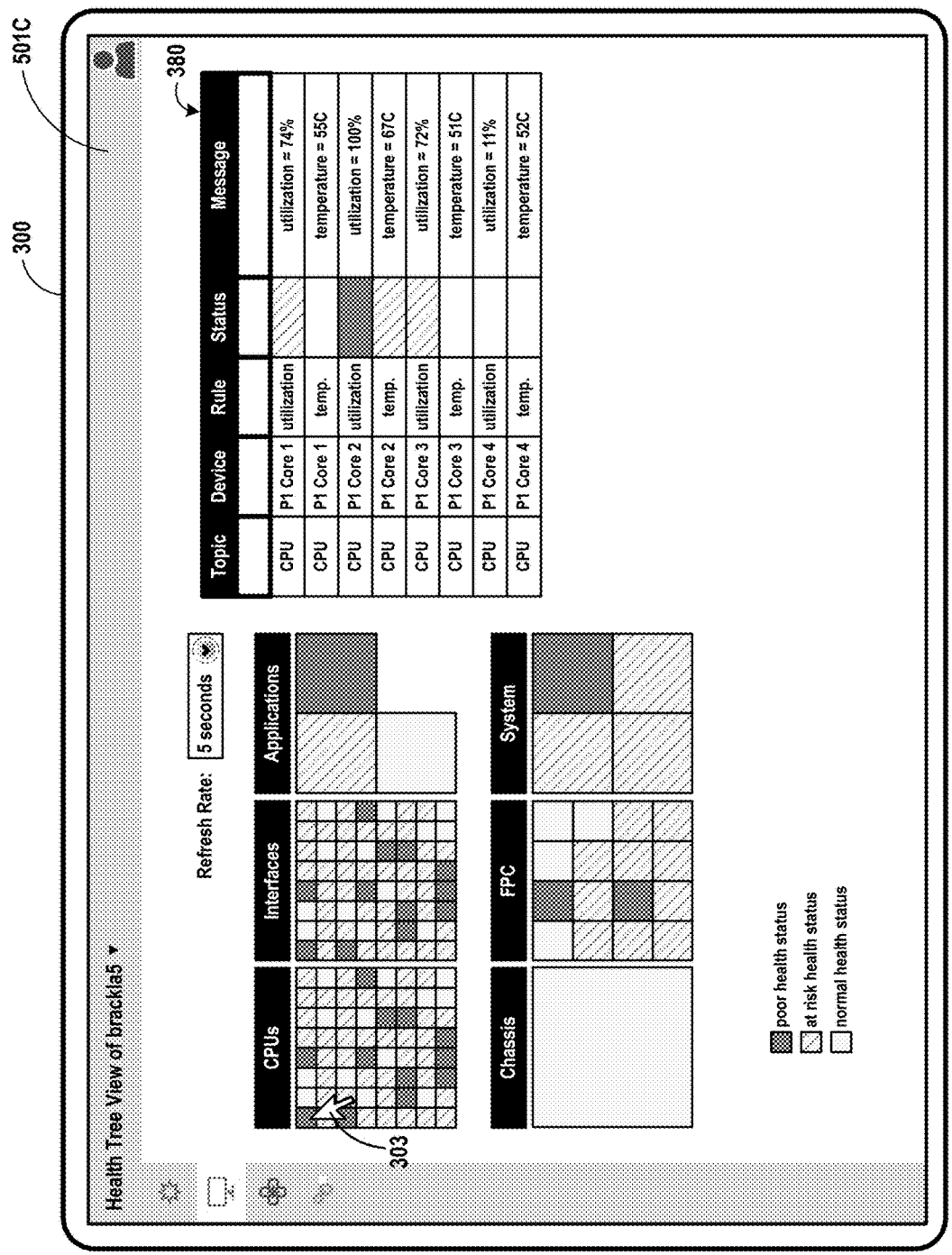
FIG. 5C is an example user interface illustrating a modification to tabular information presented within the user interface of FIG. 5B in response to user input, in accordance with one or more aspects of the present disclosure.

FIG. 5A, FIG. 5B, and FIG. 5C are conceptual diagrams illustrating example user interfaces presented by a user interface device in accordance with one or more aspects of the present disclosure. Each of user interfaces 501 illustrated in FIG. 5A through FIG. 5C may correspond to a user interface presented by user interface device 129 of FIG. 1 and/or FIG. 2, and may present information about health status or other information about one or more network devices 126 as illustrated in FIG. 1 and/or FIG. 2. Although the user interfaces illustrated in FIG. 5A through FIG. 5C are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 5A, FIG. 5B, and FIG. 5C may be described herein within the context of system 200 of FIG. 2.

FIG. 5A is an example user interface illustrating visualizations of data collected from groups of devices on a network, in accordance with one or more aspects of the present disclosure. As with the user interfaces illustrated in FIG. 3A through FIG. 3C, user interface 501A of FIG. 5A may be presented by display device 300, which may be associated with user interface device 129 of FIG. 2.

In presenting user interface 501A, controller 201 may group certain data for presentation within user interface 501A. For instance, with reference to an example that can be described in the context of FIG. 2 and FIG. 5A, visualization module 224 receives, from monitoring module 222, information about data collected from network devices 126. Visualization module 224 analyzes the information about the collected data and determines that the collected data is based on a set of network devices 126 that include 64 processors, each having 4 cores per processor. Visualization module 224 further determines, based on the amount of the collected data and/or the total number of processor cores, that the number of CPU cores present in the set of network devices 126 is large, and presenting a visual indication in a user interface for each of the CPU cores would likely result in display elements that are so small as to not be sufficiently clear and not easily-distinguishable from other display elements. In other words, for a given square area, such as the area under each of topic headers 311 as illustrated in FIG. 5A (e.g., the area in which display element set 310A or display element set 310D is displayed), visualization module 224 may be configured to present only up to a certain number (i.e., a threshold number) of display elements.

In the example of FIG. 5A, and with reference to FIG. 2, when the total number of health status values exceeds a threshold of total number of tiles, visualization module 224 may start grouping health status values. The number of health status values associated with a given tile may depend on the total number of health status values there are to render within a user interface. Visualization module 224 may calculate a grouping factor, which may involve applying a "ceiling" function to the total number of health status values divided by the maximum number of tiles that can be presented in the area under each of topic headers 311. Visualization module 224 may dynamically calculate the size of each tile or display element based on the number of health status values to represent a given block or display element set. Visualization module 224 may calculate the number of columns that will be needed to fit a given number of health status values into the square block using square root of the total number of health status values. However, the blocks 310 need not have an identical number of rows and columns. Visualization module 224 may adjust for tile margins when rendering, and calculate the appropriate tile sizes. Once the grouping factor is calculated, visualization module 224 may group health status values, tag a group name to each group and render each group as a tile with color that represents the statuses of each of the devices, performance indicators, metrics, or rules it encompasses. In one specific example, for a square area having a side measuring 150 pixels, only 220 display elements might be presented, which may be a number sufficiently small to ensure that the colors of display elements, presented as individual tiles, are clear and easily distinguishable from other display elements (i.e., tiles in the example of FIG. 5A). However, in other examples, a higher or lower density of display elements might be appropriate based on the size of each of the display elements and the required level of visual load.

Visualization module 224 may generate data for a user interface that groups CPU cores. For instance, still referring to FIG. 2 and FIG. 5A, visualization module 224 generates data underlying a user interface that presents display elements for the health status values associated with the 64 processors, subject to the size constraints described above. To address those size constraints, visualization module 224 determines an appropriate grouping for the CPU data, in order to reduce the number of display elements to be presented within user interface 501A. In the example of FIG. 5A, visualization module 224 determines that the health status data for each of the four cores for each processor will be grouped together as a health status group, and that each health status group will have a group health status value that represents the collective health status of all four of the cores within each processor. Accordingly, visualization module 224 generates visualization data 228 underlying a user interface where display element set 310A has 64 display elements, each representing a group health status value that indicates the health status values associated with each of the cores within each processor. In the example of FIG. 5A, display element 312A might correspond to node 411 of FIG. 4, since node 411 encompasses all four cores of processor 1.

User interface device 129 may present a user interface presenting user interface 501A. For instance, referring again to FIG. 2 and FIG. 5A. Visualization module 224 causes communication unit 215 to output a signal over network 106. User interface device 129 detects a signal over network 106 and determines that the signal includes information sufficient to present a user interface. User interface device 129 presents user interface 501A at display device 300 as illustrated in FIG. 5A. In FIG. 5B, each of the 64 display elements presented under topic header 311A are colored or shaded to represent a group health status value, each representing the health status of one of the 64 processors and the four cores associated with each respective processor.

FIG. 5B is an example user interface illustrating a popup window that provides details about one of the display elements illustrated within the user interface of FIG. 5A, in accordance with one or more aspects of the present disclosure. User interface 501B of FIG. 5B may be presented at display device 300 in response to input moving cursor 303 over display element 512A in FIG. 5A. For instance, with reference to FIG. 2 and FIG. 5A, user interface device 129 detects input and accesses information to update user interface 501A. User interface device 129 updates user interface 501A to include popup window 515A, and presents user interface 501B at display device 300 as illustrated in FIG. 5B.

In FIG. 5B, popup window 515A includes further detail underlying display element 512A. In the example shown, display element 512A corresponds to four cores within processor 1 for a given device included in system 200, and may be represented by node 411 in data model topic tree 400 of FIG. 4. In such an example, each core is evaluated based on utilization and temperature. Processor 1, for example, which is represented by display element 512A, includes four cores, each having a health status values associated with utilization and temperature. Details underlying each health status value is shown within popup window 515A, and in addition, a display element associated with each core for processor 1 is also shown within popup window 515A (along the left-hand side of popup window 515A). Each such display element illustrated within popup window 515A is colored or shaded to indicate the health status of each corresponding core with processor 1. Display element 512A is presented as having a "poor health status" in FIG. 5A, because in this example, the group health status is defined by the health status values of the members of the group, and the least favorable health status for any of the cores for processor 1 is a "poor health status," and that status is therefore used as the group health status for processor 1 (see node 411 of FIG. 4).

FIG. 5C is an example user interface illustrating a modification to tabular information presented within the user interface of FIG. 5B in response to user input, in accordance with one or more aspects of the present disclosure. User interface 501C of FIG. 5C may be presented at display device 300 in response to input selecting display element 512A (e.g., using cursor 303) in FIG. 5B. For instance, with reference to FIG. 2 and FIG. 5B, user interface device 129 detects input and in response, determines that the user is seeking to present in table 380 only information associated with display element 512A. User interface device 129 updates user interface 501B to modify the data presented within table 380 to include only information associated with processor 1 (represented by display element 512A), and presents user interface 501C at display device 300 as illustrated in FIG. 5C.

In FIG. 5C, table 380 has been filtered to include only those rows associated with display element 512A. The information encompassed by the group health status value represented by display element 512A corresponds to the utilization and temperature health status values of each of the four cores within processor 1, as shown in table 380 of FIG. 5C.

Figure 6:
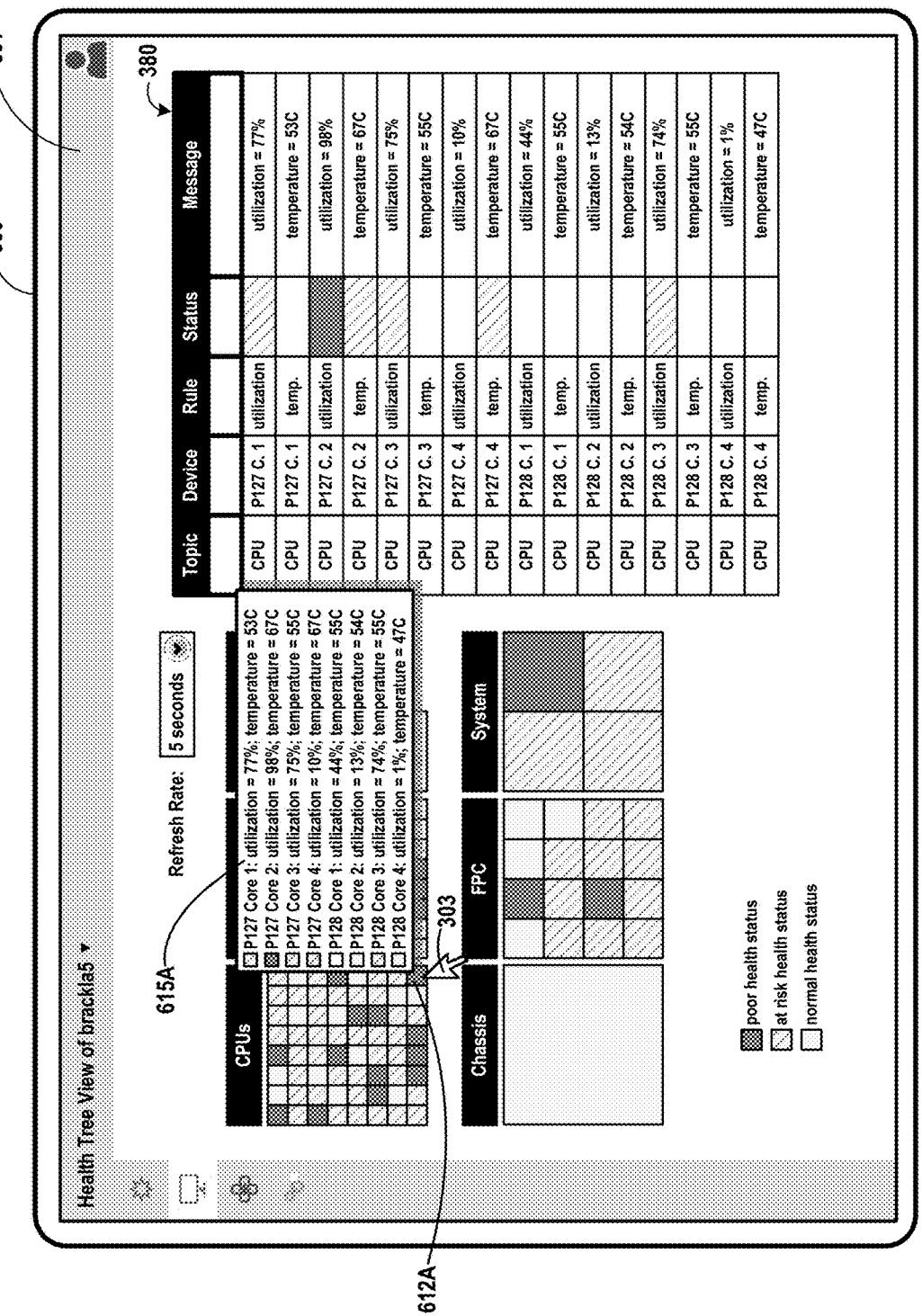
FIG. 6 is an example user interface illustrating visualizations of data collected from another grouping of devices on a network, in accordance with one or more aspects of the present disclosure.

FIG. 6 is an example user interface illustrating visualizations of data collected from another grouping of devices on a network, in accordance with one or more aspects of the present disclosure. In FIG. 6, controller 201 may determine that the set of network devices 126 includes a total of 128 processors, each having 4 cores per processor, and may further determine an appropriate scheme for presenting health status information for the 128 processors and associated cores. For instance, again with reference to FIG. 2, visualization module 224 analyzes information indicating that the data collected from network devices 126. Visualization module 224 further determines, based on the amount of the collected data and the total number of processor cores being monitored, that it would be appropriate to group health status information associated with pairs of processors. Visualization module 224 generates one or more user interfaces that group health status values for each pair of processors. Visualization module 224 causes communication unit 215 to output information about the generated user interfaces over network 106. User interface device 129 receives the information about the user interfaces and determines that the information is sufficient to present one or more user interfaces. User interface device 129 presents user interface 601 at display device 300 as illustrated in FIG. 6.

In FIG. 6, each of the tiles in display element set 310A under topic header 311A correspond to one pair of processors and the health status information of the cores encompassed by the pair of processors. FIG. 6 further illustrates cursor 303 being moved over display element 612A, causing popup window 615A to be presented. If user interface device 129 detects selection of display element 612A by cursor 303, user interface device 129 may update table 380 within user interface 601 so that table 380 includes only the information corresponding to display element 612A (representing processors 127 and 128), as shown in FIG. 6.

Figure 7:
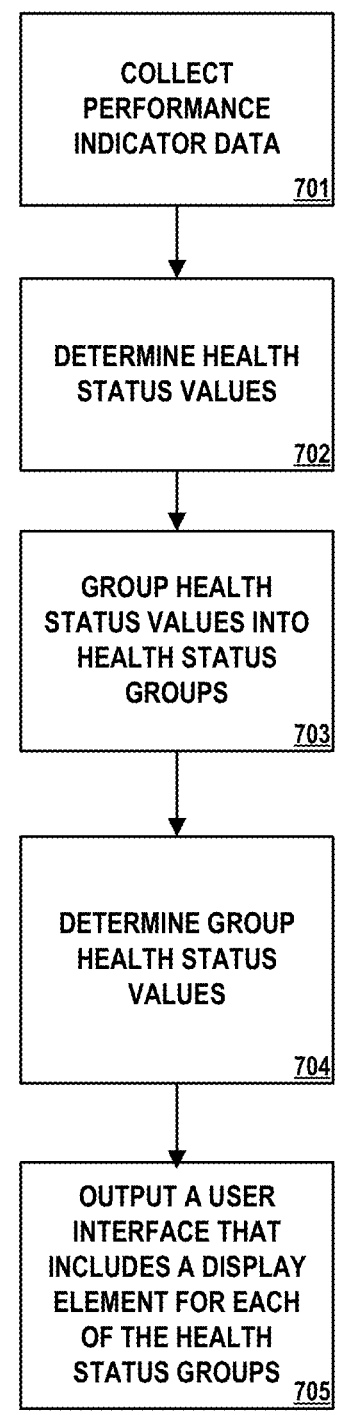
FIG. 7 is a flow diagram illustrating operations performed by an example controller in accordance with one or more aspects of the present disclosure.

FIG. 7 is a flow diagram illustrating operations performed by an example controller in accordance with one or more aspects of the present disclosure. FIG. 7 is described below within the context of controller 201 of FIG. 2. In other examples, operations described in FIG. 7 may be performed by one or more other components, modules, systems, or devices. Further, in other examples, operations described in connection with FIG. 7 may be merged, performed in a difference sequence, omitted, or may encompass additional operations not specifically illustrated or described.

Controller 201 may collect performance indicator data for one or more network devices (701). For instance, in some examples, monitoring module 222 of controller 201 causes communication unit 215 to output signals over network 106. Network device 126A detects a signal over network 106. Network device 126A determines that the signal includes a request to establish a connection to network device 126A for the purpose of collecting data about the performance of network device 126A, including data about the performance of CPUs within network device 126A. Network device 126A outputs a responsive signal over network 106. Communication unit 215 of controller 201 detects a signal and outputs an indication of the signal to monitoring module 222. Monitoring module 222 determines that the signal is responsive to the earlier signal output by controller 201. Monitoring module 222 may cause communication unit 215 to output further signals over network 106, and may receive responsive signals in a process of choosing, negotiating, and/or configuring an appropriate transport method or mechanism for receiving information, such as information as key performance indicator information, from network device 126A. Monitoring module 222 establishes a transport and begins receiving performance indicators that may be used for evaluating one or more health status rules for network device 126A.

Controller 201 may determine a plurality of health status values (702). For instance, in some examples, visualization module 224 of controller 201 determines a plurality of health status values based on one of a plurality of health status rules that asses a subset of the performance indicator data. In one example, the health status rule may evaluate processor core utilization performance indicators and determine that a specific processor core has an "at risk" health status. In another example, the health status rule may evaluate processor core temperature values and determine that another processor core has a "normal" health status value.

Controller 201 may group the health status values into a plurality of health status groups (703). For instance, in some examples, monitoring module 222 outputs to visualization module 224 data derived from the information collected from each of network devices 126.

Visualization module 224 evaluates the data and determines, based on how many health status values are in the plurality of health status values, that the number of health status values exceeds a threshold amount of values that can be effectively displayed within a user interface to be presented to an administrator. Visualization module 224 may determine the threshold amount based on the size of the interface, and/or the expected administrator 128 for presenting the user interface. In the example illustrated in FIG. 5A, for example, visualization module 224 determines that the number of health status values for CPUs exceeds the threshold amount (e.g., 64 in the example of FIG. 5A) for presentation within a user interface. Visualization module 224 groups subsets of the health status values into groups, where each group includes a set of logically-related health values. In the example of FIG. 5A, visualization module 224 groups all of the performance indicators relating to processor 1 (see FIG. 4) into a group.

Controller 201 may determine, for each of the health status groups, a group health status value (704). For instance, in some examples, visualization module 224 of controller 201 identifies, for each of the health status groups, the health status value included within that group that has the poorest health. For example, if one or more of the health status values within a group has a "poor" health status, visualization module 224 determines that the group health status value for that group also has a "poor" health status. Referring again to the example of FIG. 4 and FIG. 5A, visualization module 224 may determine, for processor 1, that core 2 utilization and core 4 utilization have a "poor" health status. Accordingly, visualization module 224 identifies the least favorable health status value as a group health status value for the group of performance indicators associated with processor 1. In the example described, visualization module 224 may determine that the group health status value is the least favorable health status value if any of the performance indicators have the lowest health status value, regardless of the values of the other performance indicators. In other examples, visualization module 224 may apply a different algorithm or process that takes into account health status values of other performance indicators in such a situation.

Controller 201 may output a user interface that includes a display element for each of the health status groups (705). For instance, referring again to the examples of FIG. 2 and FIG. 5A, visualization module 224 may cause communication unit 215 to output a signal over network 106. User interface device 129 may detect a signal over network 106. User interface device 129 may determine that the signal includes information sufficient to generate and present a user interface. User interface device 129 outputs a user interface, where the user interface includes a display element for each group health status. Each display element in FIG. 5A is presented as a tile that is colored or shaded to represent the group health status value. For different health status values, the color or shading is different. In one example, red might be used for tiles corresponding to group health status values that represent low or poor health. Green might be used for tiles that correspond to normal group health status values. One or more other colors, such as yellow, might be used for tiles that correspond to group health status values that are between normal (green) and low (red). Although FIG. 5A illustrates display elements corresponding to group health status values as colored or shaded tiles, other ways of presenting group health status values (e.g., involving size, animation, numbers, shapes) may be used.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., controllers 201, network devices 126, user interface devices 129, networks 106, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   collecting, by a computing system, performance indicator data for one or more network devices, the performance indicator data including a plurality of instances of performance indicator data;
   determining, by the computing system, a number of health status values, each health status value associated with one of the plurality of instances of performance indicator data, wherein each of the health status values is determined based on applying a health status rule to a respective instance of performance indicator data;
   grouping the health status values, by the computing system and based on determining that the number of health status values exceeds a threshold number of health status values, into a plurality of health status groups, wherein each of the health status groups includes two or more health status values, and wherein each of the health status values within a health status group are based on a common type of performance indicator information;

determining, by the computing system and for each of the health status groups, a group health status value, wherein the group health status value for each health status group is determined based on at least one of the health status values within the health status group, wherein the health status values within one of the health status groups range from a first value to a second value along a progressively increasing range of health where the second value is associated with a higher health status value than the first value, and wherein determining the group health status value for that health status group includes assigning the first value as the group health status value for that health status group; and outputting, by the computing system, a user interface that includes a display element for each of the health status groups, wherein each of the display elements provides a visual indication of the group health status value associated with each respective health status groups.

2. The method of claim 1, wherein grouping the health status values into the plurality of health status groups includes:
determining the threshold number of health status values based on how many display elements are distinguishable one another within a single user interface; and
determining that the number of health status values exceeds the threshold number.

3. The method of claim 1, wherein grouping the health status values into the plurality of health status groups includes:
determining that the number of health status values exceeds the threshold number, wherein the threshold number corresponds to a maximum quantity of display elements that can effectively present visual information about health status values within a single user interface.

4. The method of claim 1, wherein the performance indicator data is organized into a hierarchical data model, and wherein grouping the health status values into the plurality of health status groups includes:
grouping the health status values into subtrees of the hierarchical data model.

5. The method of claim 1, wherein each of the health status values within each health status group are based on performance indicator data for the same network device.

6. The method of claim 1, wherein the performance indicator data includes at least one of central processing unit (CPU) utilization data, CPU temperature data, interface data, application data, chassis data, physical interface card data, system data.

7. A system comprising:
a storage device; and
processing circuitry having access to the storage device and configured to:
collect performance indicator data for one or more network devices, the performance indicator data including a plurality of instances of performance indicator data,
determine a number of health status values, each health status value associated with one of the plurality of instances of performance indicator data, wherein each of the health status values is determined based on applying a health status rule to a respective instance of performance indicator data,
group the health status values, based on determining that the number of health status values exceeds a threshold number of health status values, into a plurality of health status groups, wherein each of the health status groups includes two or more health status values, and wherein each of the health status values within a health status group are based on a common type of performance indicator information,
determine, for each of the health status groups, a group health status value, wherein the group health status value for each health status group is determined based on at least one of the health status values within the health status group, wherein the health status values within one of the health status groups range from a first value to a second value along a progressively increasing range of health where the second value is associated with a higher health status value than the first value, and wherein to determine the group health status value for that health status group, the processing circuitry is further configured to assign the first value as the group health status value for that health status group, and
output a user interface that includes a display element for each of the health status groups, wherein each of the display elements provides a visual indication of the group health status value associated with each respective health status groups.

8. The system of claim 7, wherein to group the health status values into the plurality of health status groups, the processing circuitry is further configured to:
determine the threshold number of health status values based on how many display elements can be distinguished from one another within a single user interface; and
determine that the number of health status values exceeds the threshold number.

9. The system of claim 7, wherein to group the health status values into the plurality of health status groups, the processing circuitry is further configured to:
determine that the number of health status values exceeds the threshold number, wherein the threshold number corresponds to a maximum quantity of display elements that can effectively present visual information about health status values within a single user interface.

10. The system of claim 7, wherein the performance indicator data is organized into a hierarchical data model, and wherein to group the health status values into the plurality of health status groups the processing circuitry is further configured to:
group the health status values into subtrees of the hierarchical data model.

11. The system of claim 7, wherein each of the health status values within each health status group are based on performance indicator data for the same network device.

12. The system of claim 7, wherein the performance indicator data includes at least one of central processing unit (CPU) utilization data, CPU temperature data, interface data, application data, chassis data, physical interface card data, system data.

13. A non-transitory computer-readable storage medium comprising instructions that, when executed, configure processing circuitry of a computing system to:
collect performance indicator data for one or more network devices, the performance indicator data including a plurality of instances of performance indicator data;
determine a number of health status values, each health status value associated with one of the plurality of instances of performance indicator data, wherein each of the health status values is determined based on applying a health status rule to a respective instance of performance indicator data;
group the health status values, based on determining that the number of health status values exceeds a threshold number of health status values, into a plurality of health status groups, wherein each of the health status groups includes two or more health status values, and wherein each of the health status values within a health status group are based on a common type of performance indicator information;

determine, for each of the health status groups, a group health status value, wherein the group health status value for each health status group is determined based on at least one of the health status values within the health status group, wherein the health status values within one of the health status groups range from a first value to a second value along a progressively increasing range of health where the second value is associated with a higher health status value than the first value, and wherein the instructions that configure the processing circuitry to determine the group health status value for that health status group further include instructions that configure the processing circuitry to assign the first value as the group health status value for that health status group; and output a user interface that includes a display element for each of the health status groups, wherein each of the display elements provides a visual indication of the group health status value associated with each respective health status groups.

14. The computer-readable storage medium of claim 13, wherein to group the health status values into the plurality of health status groups, the instructions further configure the processing circuitry to:
  determine the threshold number of health status values based on how many display elements can be distinguished from one another within a single user interface;
  determine that the number of health status values exceeds the threshold number.

15. The computer-readable storage medium of claim 13, wherein a quantity represents how many health status values are in the plurality of health status values, and wherein to group the health status values into the plurality of health status groups, the instructions further configure the processing circuitry to:
  determine that the number of health status values exceeds the threshold number, wherein the threshold number corresponds to a maximum quantity of display elements that can effectively present visual information about health status values within a single user interface.

16. The computer-readable storage medium of claim 13, wherein the performance indicator data is organized into a hierarchical data model, and wherein to group the health status values into the plurality of health status groups the instructions further configure the processing circuitry to:
  group the health status values into subtrees of the hierarchical data model.

* * * * *